United States Patent [19]

Ooe et al.

[11] Patent Number: 4,810,572

[45] Date of Patent: Mar. 7, 1989

[54] PERMANENT MAGNET AND PROCESS FOR PRODUCING THE SAME

[75] Inventors: Takashi Ooe; Minoru Nagai; Yoshitaka Momotari, all of Kanagawa, Japan

[73] Assignee: Mitsui Toatsu Chemicals, Inc., Tokyo, Japan

[21] Appl. No.: 14,484

[22] Filed: Feb. 13, 1987

[30] Foreign Application Priority Data

Feb. 17, 1986 [JP] Japan .................................. 61-30638

[51] Int. Cl.$^4$ ............................ B32B 5/16; H01F 3/00

[52] U.S. Cl. .................................... 428/323; 148/105; 148/301; 252/62.54; 264/271.1; 264/331.11; 335/302; 335/303; 428/413; 428/900; 428/928

[58] Field of Search ............... 428/900, 928, 309, 323, 428/413; 148/301, 105, 108; 335/302, 303; 264/271.1, 331.11; 252/62.54

[56] References Cited

U.S. PATENT DOCUMENTS

| | | | |
|---|---|---|---|
| 3,424,578 | 1/1969 | Sfrnat | 148/301 |
| 3,540,945 | 11/1970 | Strnat | 148/301 |
| 3,677,947 | 7/1972 | Ray | 148/301 |
| 3,933,536 | 1/1976 | Doser | 148/301 |
| 4,063,971 | 12/1977 | Greinacher | 428/900 |
| 4,626,371 | 12/1986 | Ikenaga | 428/900 |
| 4,664,723 | 5/1987 | Ishii | 148/301 |
| 4,668,145 | 5/1987 | Luise | 252/62.54 |
| 4,689,163 | 8/1987 | Yamashita | 428/900 |

FOREIGN PATENT DOCUMENTS

| | | |
|---|---|---|
| 2428296 | 4/1976 | Fed. Rep. of Germany . |
| 1447264 | 8/1976 | United Kingdom . |
| 1531317 | 11/1978 | United Kingdom . |

*Primary Examiner*—Paul J. Thibodeau

*Attorney, Agent, or Firm*—Kane, Dalsimer, Sullivan, Kurucz, Levy, Eisele and Richard

[57] ABSTRACT

The permanent magnet which is excellent in moldability, capable of maintaining the dimensional stability and magnetic properties during manufacturing steps, and having good dimensional stability at high temperature, water proofness, oil resistance and solvent resistance, can be constituted by a shaped substance containing, as major ingredients, rare-earth magnet powder and, as binder materials which has been cured and the process for producing the same.

8 Claims, No Drawings

PERMANENT MAGNET AND PROCESS FOR PRODUCING THE SAME

FIELD OF THE INVENTION

This invention relates to a permanent magnet using a binder material and a process for producing the same.

BACKGROUND OF THE INVENTION

Sintered magnets prepared by sintering ferrite powder have been known as the permanent magnet. They have been used for various applications. Further, ferromagnetic inter-metallic compounds containing as major constituent elements rare-earth metals and iron group metals, such as samarium-cobalt magnet (hereinafter simply referred to as the rare-earth inter-metallic compound) have been developed in recent years. (See Proceedings of the Eighth International Workshop on Rare-Earth Magnets and Their Applications, Dayton, Ohio, USA, May 1985, 6-8 Edited by Karl J. Strnat.)

Although they have high magnetic performance, the sintered magnets, however, are hard and brittle in themselves, so that they are poor in moldability and have a problem in the dimensional accuracy. Accordingly, so-called plastic magnets prepared by mixing and dispersing magnetic powder in an organic resin (hereinafter simply referred as resin) and molding thus obtained mixture have been developed. The magnetic powder used for this purpose has been mainly composed of ferrite, but, since the magnetic force of such resin-bonded magnets is poor as compared with that of the sintered magnets, development has been made recently to such a resin-bonded magnet using powder of ferromagnetic rare-earth inter-metallic compound as described in Japanese Patent Open-Laid Applications Nos. 49-3196/1974, 50-143765/1975 and 54-16698/1979.

In this specification, the power of ferromagnetic rare-earth inter-metallic powder is referred to as the rare-earth magnet powder.

By the way, with the extending trend for the application uses of those equipments using plastic magnets in recent years, conditions for using them tend to become severer and, particularly, it has highly been demanded to supply resin-bonded magnets excellent in the dimensional stability at high temperature, protectability against water, oil-resistance and solvent-resistance.

Characteristics of the resin-bonded magnets are of course varied depending on the compositions of the starting magnetic powder, kinds of resin as the binder, shapes of the molding product and the like. From the overall point of view, the performance of the resin as the binder is most important so that the magnet may be excellent in the moldability, it may maintain the dimensional stability and magnetic properties during manufacturing steps and that it may have dimensional stability at high temperature, protectability against water, oil resistance and solvent resistance as a shaped substance.

As the resin for the resin-bonded magnets, thermoplastic resins such as polyamide and polyolefin (Japanese Patent Publication No. 59-5218/1984) or thermosetting resins such as epoxy and phenol (Japanese Patent Open-Laid Application No. 54-16698/1979) have heretofore been used. They are used, in view of the magnetic property and the physical strength, in an amount within a range usually from 55 to 12 % by volume (about 15-2 % by weight). They, however, have a heat expansion coefficient as high as about $5\text{-}15\times10^{-5}$ 1/° C., so that they have poor dimensional stability at high temperature. Further, although there have been those resins excellent in oil resistance and solvent resistance, they are poor in dimensional stability at high temperature and protectability against water.

SUMMARY OF THE INVENTION

This invention has been made in view of the foregoing situations and the main object thereof is to provide a resin-bonded magnet and process for producing the same, which is excellent in moldability, capable of maintaining the dimensional stability and magnetic properties during manufacturing steps, and having good dimensional stability at high temperature, protectability against water, oil resistance and solvent resistance as a shaped substance.

The present inventors have made an earnest study for attaining foregoing purpose and, as a result, accomplished this invention.

The present invention in the first aspect resides in a permanent magnet comprising a shaped substance containing, as major ingredients, rare-earth magnet powder and, as binder materials, an esterification product of polycarboxylic acid and polyol and a compound capable of crosslinking by an addition reaction with the esterification products, the binder materials having been cured.

The present invention in the second aspect resides in a process for producing a permanent magnet comprising molding to prepare a shaped substance using rare-earth magnet powder and, as binder materials, an esterification product of polycarboxylic acid and polyol and a compound capable of crosslinking by an addition reaction with the esterification product, and subjecting the shaped substance to a heat curing treatment at the same time with or after the molding.

DETAILED DESCRIPTION OF THE INVENTION

As the rare-earth magnet powder to be used in this invention, one or more of the powder of the rare-earth magnets comprising a rare-earth inter-metallic compound known by the indications such as $SmCo_5$, $Sm_2Co_{17}$, Nd-Fe-B, etc. as the chief component (preferably fine powder having a mean particle diameter of about 1-150 $\mu$m) may be used.

As the polycarboxylic acid to be used for obtaining the esterification product, one or more of the polycarboxylic acids selected from the group consisting of maleic acid, maleic anhydride, fumaric acid, phthalic acid, phthalic anhydride, citric acid, isocitric acid, aconitic acid, tricarballylic acid and 1,2,3,4-butanetetracarboxylic acid may preferably be used in practice.

As the polyol to be used for obtaining the esterification product, one or more of the polyols selected from the group consisting of ethylene glycol, propylene glycol, polyethylene glycol with a molecular weight of 600 or less, polypropylene glycol with a molecular weight of 600 or less, glycerin, diglycerin, pentaerythritol, dipentaerythritol, trimethylolethane, trimethylolpropane and butane diol may preferably be used in practice.

The esterification reaction may be carried out at about 140°-160° C. for 2-7 hours, with the result of producing a solid or highly viscous product. If necessary, the degree of proceeding of the reaction may be determined by the measurement of the amount of water produced, the acid value and consideration of the composition of the raw materials.

The ratio of the amounts of the carboxylic acid and the polyol used for obtaining the esterification product may be determined in consideration of the combination of the numbers of the carboxylic groups and hydroxyl groups possessed respectively in them, it is preferred to take such a ratio as from 0.3 to 3, more preferably from 0.5 to 2 as expressed by the ratio between the number of free carboxylic acid groups and that of free hydroxyl groups in the reaction product.

The esterification product by itself may be subject to crosslinking reaction by, for example, the heat treatment under the existence of said free carboxylic acid groups or free hydroxyl groups. In this invention, however, the curing or crosslinking reaction be carried out under the existence of the compound capable of crosslinking by addition reaction with the esterification product so as to advance the degree of crosslinking of the binders.

As the compound capable of crosslinking by an addition reaction with the esterification products, epoxy compound or isocyanate compound is preferred, with the epoxy compound being particularly preferred.

Illustrative examples of the epoxy compound include bisphenol A, novolac type phenol resin, diglycidyl ether type epoxy compounds obtained from the reaction between hydroquinone and epichlorohydrine, diglycidyl ester type epoxy compounds such as diglycidyl phthalate, cycloaliphatic type epoxy compounds and heterocyclic type epoxy compounds. Among them, the epoxy equivalent (the amount of the resin containing 1 g equivalent of epoxy group) is preferably less than 500.

Illustrative examples of the isocyanate compound include diphenylmethane diisocyanate, tolylene diisocyanate and derivatives thereof.

The content of the rare-earth magnet powder in the permanent magnet according to this invention is preferably from 85 to 99%, more preferably, from 93 to 98.8% by weight, and the content of the esterification product and the compound capable of crosslinking by an addition reaction with the esterification product as the binders is preferably from 15 to 1% by weight, more preferably, from 7 to 1.2% by weight.

In order to prepare the permanent magnet according to this invention, the rare-earth magnet powder, the esterification product and a compound as the crosslinking component are at first mixed, sufficiently kneaded, molded by way of known method such as extrusion, injection and compression and then subjected to heat curing treatment at the same time with or after the molding. The heat curing treatment may be conducted at 150° to 200° C. for 10 to 60 minutes in the case of using the epoxy compound or at room temperature to 100° C. for 10 to 60 minutes in the case of using the isocyanate compound as the compound for crosslinking. After the molding and the heat curing treatment, the shaped substance is cooled so as to obtain a magnetized permanent magnet according to this invention.

In view of the industrial availability, since the molding speed is much higher than the heat curing speed, it is economically advantageous to separate the process into the molding step and the heat curing step.

By the use of the binder according to this invention, it is possible to obtain a molding and curing product which is not only excellent in the protectability against water, oil resistance and solvent resistance, but also excellent in the dimensional stability at high temperature for the reason that the heat expansion coefficient is approximately to that of the magnetic powder (about $0.6\text{-}1.4\times10^{-5}$ 1/° C.). For instance, the heat expansion coefficient of $Sm_2Co_{17}$ plastic magnetic containing 20% by volume (3.5 wt%) of binder is bout ¼ ($1.4\times10^{-5}$ 1/° C.) as compared with the coefficient ($5.0\times10^{-5}$ 1/° C.) of the conventional binder of epoxy resin using polyamide resin type curing agent.

This invention will now be described more specifically referring to the following Examples and

COMPARATIVE EXAMPLES.

EXAMPLE 1

Water was removed from the product obtained by the esterification reaction between one mol of citric acid and one mol of ethylene glycol by heating and 1.5 g of bisphenol type epoxy resin (EPICOAT 834 manufactured by Shell Chemical Inc.) dissolved in tetrahydrofuran were added to 2.5 g of thus dehydrated product. 76 g of $Sm_2Co_{17}$ magnet powder (particle diameter of about 3-60 μm) were added thereto, kneaded in a mortar, removed with tetrahydrofuran under vacuum, charged into a mold and then subjected to compression molding under the magnetic field at a pressure of 4 t/cm$^2$. The specimen had a shape of 20 φ×10 l mm. Then, the molding product was heat-cured at 200° C. for 20 minutes and cooled to obtain magnetized substance, which was used as a sample for various evaluation tests. The results are shown in Tables 1 and 2.

EXAMPLE 2

Water was removed from the product obtained by the esterification reaction between one mol of 1,2,3,4-butane tetracarboxylic acid and 2 mol of ethylene glycol by heating, and 2.5 g of diglycidy ester of terephthalic acid were added to 2.5 g of thus dehydrated product. The mixture was ground in a mortar into powdery material. Then, 95 g of $SmCo_5$ magnet powder (particle diameter of about 5-12 μm) were added thereto, kneaded in a mortar, charged in a mold. Then, the same procedures as in Example 1 were conducted and various evaluation tests were carried out for the molding product. The results are shown in Tables 1 and 2.

EXAMPLE 3

Water was removed from the product obtained by the esterification reaction between one mol of citric acid and one mol of trimethylolpropane by heating and 1.5 g of hydroquinone diglycidyl ether were added to 1.5 g of thus dehydrated product. The mixture was ground in a mortar into a powdery state. Then, 97 g of Nd-Fe-B magnet powder (particle diameter of about 44-105 μm) were added thereto, kneaded in a mortar, charged in a mold. Then, the same procedures as in Example 1 were carried out to obtain molding products and various evaluation tests were conducted. The results are shown in Tables 1 and 2.

EXAMPLE 4

Water was removed from the product obtained by the esterification reaction between one mol of 1,2,3,4-butane tetracarboxylic acid and 0.5 mol of pentaerythritol and 0.5 mol of propylene glycol by heating. Then, 1.5 g of hydroquinone diglycidyl ether were added to 1.5 g of thus dehydrated product and ground in a mortar into a powdery state. Then, 97 g of $Sm_2Co_{17}$ magnet powder (particle diameter of 3-60 μm) were added thereto, kneaded in a mortar and then charged into a mold. Thereafter, the same procedures as Example 1 were conducted and various evaluation tests were carried for the thus obtained molding product. The results are shown in Tables 1 and 2.

EXAMPLE 5

The mixture of 97 g of $Sm_2Co_{17}$ magnet powder (particle diameter of about 5–10 μm), 1.5 g of esterification reaction product obtained from one mol of citric acid, 2 mol of ethylene glycol, 1.5 g of diphenyl methane-diisocynate (high purity product) and 10 ml of acetone was kneaded at a temperature lower than 15° C. in a dry nitrogen gas stream in a mortar. Then, after removing acetone under vacuum, the mixture was molded in the same procedures as in Example 1. Then, heat-curing reaction was conducted at 50° C. for 60 min followed by cooling. Various evaluation tests were carried out for thus obtained magnetized product.

COMPARATIVE EXAMPLE 1

After adding 95 g of $Sm_2Co_{17}$ magnetic powder (particle diameter of about 3–60 μm) to a mixture of 4.76 g of epoxy resin (EPICOAT 834 manufactured by Shell Chemical Inc., epoxy equivalent: 450–500) and 0.245 g of imidazole type curing agent, the mixture was kneaded in a mortar, charged in a mold and subjected to compression molding under a magnetic field at a pressure of 4 t/cm$^2$. The dimension of the molding product was 20 $\phi\times$10 1 mm. Then, the molding product was heat-cured at 150° C. for 4 hours, followed by cooling. Thus magnetized product was used as the sample, and various evaluation tests were carried out. The results are shown in Tables 1 and 2.

COMPARATIVE EXAMPLE 2

After adding 97 g of $Sm_2Co_{17}$ magnetic powder (particle diameter of about 3–60 μm) to a mixture of 1.85 g of epoxy resin (EPICOAT 828 manufactured by Shell Chemical Inc., epoxy equivalent of 180–200) and 1.15 g of polyamide resin (amine value of 200–230), the mixture was subjected to the same molding as in Comparative Example 1. The thus obtained molding product was heat-cured at 150° C. for 30 min followed by cooling. Thus magnetized product was used as the sample, and various evaluation tests were carried out. The results are shown in Tables 1 and 2.

COMPARATIVE EXAMPLE 3

After adding 97 g of $SmCo_5$ magnetic powder (particle diameter of 5–10 μm) to a mixture of 2.5 g of epoxy resin (EPICOAT 828) and 0.5 g of phenol novolac type curing agent, the mixture was subjected to the same molding as in Comparative Example 1. The thus obtained molding product was heat-cured at 180° C. for 60 minutes, followed by cooling. Thus magnetized product was used as the sample and various evaluation tests were carried out. The results are shown in Tables 1 and 2.

As apparent from the foregoing Examples and Comparative Examples, the permanent magnets according to this invention are excellent in the moldability and maintain dimensional stability and magnetic properties before and after the heat-curing treatment. In addition, the magnets are also excellent in the oil resistance and the solvent resistance, show no substantial dimensional change and have excellent magnetic properties. Particularly, the magnets show no dimensional change at all and maintain favorable magnetic properties and excellent protectability against water in the boiling resistance test as well as the acceleration test for the protectability against water. Further, there is no dimensional change at all and no practical problems in view of the magnetic properties also in the heat resistance test.

TABLE 1

| | Change Through Heat Curing Treatment | | |
|---|---|---|---|
| | Dimensional Change | Change of Maximum Energy Product (%) | Moldability |
| Example 1 | Less than 1% | Less than 1% | Good |
| Example 2 | " | " | " |
| Example 3 | " | " | " |
| Example 4 | " | " | " |
| Example 5 | " | 1–1.5% | " |
| Comparative Example 1 | " | 2–5% | " |
| Comparative Example 2 | Shaped Substance Collapsed by The Magnetizing Force | Measurement Impossible | " |
| Comparative Example 3 | Less than 1% | Less than 1% | " |

TABLE 2

| | Protectability*2 against Water Boiling Resistance Test (100 Hours) | | Oil Resistance*3 (Normal Temp., 1060 Hours) Dimensional Change (%) | | Oil Resistance*3 (Normal Temp., 1060 Hours) Demagnetization (%) | | Solvent Resistance*3 (Normal Temp., 1060 hours) Dimensional Change (%) | | | |
|---|---|---|---|---|---|---|---|---|---|---|
| | Dimensional Change | Demagnetization (%) | Machine Oil | Grease | Machine Oil | Grease | Benzene | Methanol | Acetone | Trichloroethylene |
| Example 1 | Less Than 1% | 1.0 | Less Than 0.1 | Less Than 0.1 | 0.9 | 0.8 | 0.1 | 0.2 | 0.2 | 0.1 |
| Example 2 | Less Than 1% | 0.8 | Less Than 0.1 | Less Than 0.1 | 1.1 | 1.1 | " | " | " | " |
| Example 3 | Less Than 1% | 1.2 | Less Than 0.1 | Less Than 0.1 | 1.0 | 1.1 | " | " | " | " |
| Example 4 | Less Than 1% | 1.1 | 0.1 | 0.1 | 1.2 | 1.2 | 0.2 | " | " | 0.2 |
| Example 5 | 1.7%*5 | 0.1 | 0.1 | 0.1 | 1.2 | 1.2 | 0.3 | 0.7 | 0.4 | 0.2 |
| Comparative Example 1 | Volume expansion coefficient became 19.9% after 13 hrs. immersion, test was interrupted. | | 1.5 | 1.4 | 1.5 | 1.4 | 0.5 | 0.9 | 0.9 | 0.6 |
| Comparative | Volume expansion coef- | | 1.2 | 1.0 | 1.4 | 1.4 | " | 0.8 | 0.8 | " |

TABLE 2-continued

| | | | | | | | | | |
|---|---|---|---|---|---|---|---|---|---|
| Example 2 | ficient became 18.4% after 20 hrs. immersion, test was interrupted. | | | | | | | | |
| Comparative[*1] Example 3 | molding product partially collapsed at 9 hrs. immersion, test was interrupted. | 1.0 | 1.0 | 1.2 | 1.2 | " | 0.9 | " | " |

| | Solvent Resistance[*3] (Normal Temp., 1060 hours) Demagnetization (%) | | | | Heat[*4] Resistance (In Air, 120° C., 1000 Hours) | |
|---|---|---|---|---|---|---|
| | Benzene | Methenol | Acetone | Trichloroethylene | Dimensional Chance | Demagnetization |
| Example 1 | 0.2 | 1.0 | 1.0 | 0.2 | Less Than 0.1% | 3.3 |
| Example 2 | " | 1.1 | " | " | Less Than 0.1% | 4.1 |
| Example 3 | " | 1.0 | " | " | Less Than 0.1% | 4.5 |
| Example 4 | " | 1.1 | " | " | Less Than 0.1% | 4.6 |
| Example 5 | 0.5 | 1.4 | 1.3 | 0.5 | 0.7 | 5.1 |
| Comparative Example 1 | 1.0 | 2.2 | 2.0 | 1.2 | 2.8 | 6.1 |
| Comparative Example 2 | 0.8 | 1.5 | 1.4 | 0.9 | 2.3 | 5.4 |
| Comparative[*1] Example 3 | 1.0 | 2.2 | 2.0 | 1.2 | 3.5 | 5.6 |

Note:
[1]Sample was prepared by applying heat curing treatment after demagetizing the shaped substance, cooling and then re-magnetizing in view of the results in Table 1.
[2]Dimensional change and the demagnetization were measured after immersion for 100 hours in boiling water under normal pressure.
[3]Dimensional change and demagnetization were measured after immersion for 1060 hours in each of the solutions under normal temperature and pressure.
[4]Dimensional change and demagnetization were measured after leaving for 1000 hours in air at 120° C.
[5]Dimensional change and demagnetization were measured after immersion for 30 hours boiling water at normal temperature.

Since the permanent magnet according to this invention, as has been described above, has a heat expansion coefficient near that of the magnetic powder, it shows no substantial dimensional change even at high temperature, and it can be used in a severe circumstance coupled with its excellent protectability against water, oil-resistance and solvent-reistance. This invention can thus develop the application ranges of permanent magnets.

What is claimed is:

1. A permanent magnet obtained by molding a composition comprising rate-earth magnet powder and, as binder materials, a dehydrated esterification product of a polycarboxylic acid and a polyol and an epoxy compound capable of crosslinking through an addition reaction with the remaining carboxylic acid and hydroxyl groups of said esterification products, and simultaneously with or subsequently to the molding, crosslinking or curing the binder materials through the addition reaction.

2. The permanent magnet as claimed in claim 1, in which said polycarboxylic acid is one or more polycarboxylic acids selected from the group consisting of maleic acid, maleic anhydride, fumaric acid, phthalic acid, phthalic anhydride, citric acid, isocitric acid, aconitic acid, tricarballylic acid and 1,2,3,4-butanetetracarboxylic acid.

3. The permanent magnet as claimed in claim 1, in which said polyol is one or more polyols selected from the group consisting of ethylene glycol, propylene glycol, polyethylene glycol with a molecular weight of 600 or less, polypropylene glycol with a molecular weight of 600 of less, glycerin, diglycerin, pentaerythritol, dipentaerythritol, trimethylolethane, trimethylolpropane and butane diol.

4. The permanent magnet as claimed in claim 1, in which the ratio of the number of free carboxyl group to the number of free hydroxyl group is within the range of 0.3-3.

5. The permanent magnet as claimed in claim 1, in which the content of said binder materials is within the range of 1-15% by weight.

6. A process for producing a permanent magnet comprising molding to prepare a shaped substance using rare-earth magnet powder and, as binder materials, an esterification product of polycarboxylic acid and polyol and an epoxy compound capable of crosslinking by an addition reaction with the esterification product, and subjecting the shaped substance to a heat curing treatment at the same time with or after the molding.

7. The process as claimed in claim 6, in which said polycarboxylic acid is one or more polycarboxylic acids selected from the group consisting of maleic acid, maleic anhydride, fumaric acid, phthalic acid, phthalic anhydride, citric acid, isocitric acid, aconitic acid, tricarballylic acid and 1,2,3,4-butane tetracarboxylic acid.

8. The process as claimed in claim 6, in which the content of said binder materials is within the range of 1-15% by weight.

* * * * *